(12) United States Patent
Wiesenberg et al.

(10) Patent No.: US 11,866,037 B2
(45) Date of Patent: Jan. 9, 2024

(54) BEHAVIOR-BASED VEHICLE ALERTS

(71) Applicant: Toyota Motor Engineering & Manufacturing North America, Inc., Plano, TX (US)

(72) Inventors: Ryan M. Wiesenberg, Ann Arbor, MI (US); Emily S. Lerner, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 88 days.

(21) Appl. No.: 16/819,536

(22) Filed: Mar. 16, 2020

(65) Prior Publication Data

US 2021/0284176 A1 Sep. 16, 2021

(51) Int. Cl.
| | |
|---|---|
| *B60W 30/09* | (2012.01) |
| *B60W 40/09* | (2012.01) |
| *B60W 50/16* | (2020.01) |
| *B60W 30/095* | (2012.01) |
| *G06V 10/764* | (2022.01) |
| *G06V 20/58* | (2022.01) |
| *B60W 50/14* | (2020.01) |
| *B60W 50/00* | (2006.01) |

(Continued)

(52) U.S. Cl.
CPC .......... *B60W 30/09* (2013.01); *B60W 30/095* (2013.01); *B60W 40/09* (2013.01); *B60W 50/16* (2013.01); *G06V 10/764* (2022.01); *G06V 20/58* (2022.01); *B60W 2050/0075* (2013.01); *B60W 2050/143* (2013.01); *B60W 2050/146* (2013.01); *B60W 2540/30* (2013.01); *B60W 2556/10* (2020.02); *B60W 2556/45* (2020.02); *G06V 20/597* (2022.01); *G06V 40/172* (2022.01)

(58) Field of Classification Search
CPC .... B60W 40/09; B60W 40/10; B60W 30/095; B60W 30/08; B60W 50/14; B60W 2556/00; B60W 2050/00; B60W 2540/30; G06K 9/00845
See application file for complete search history.

(56) References Cited

U.S. PATENT DOCUMENTS

| | | | |
|---|---|---|---|
| 7,609,150 B2 | 10/2009 | Wheatley et al. | |
| 8,384,534 B2 | 2/2013 | James et al. | |
| 10,777,083 B2 * | 9/2020 | Rau | B60R 1/081 |

(Continued)

FOREIGN PATENT DOCUMENTS

RU 2703341 C1 * 10/2019

*Primary Examiner* — Jeff A Burke
*Assistant Examiner* — Jerrod Irvin Davis
(74) *Attorney, Agent, or Firm* — Christopher G. Darrow; Darrow Mustafa PC

(57) ABSTRACT

Vehicle alerts can be presented to the driver of a vehicle based on behaviors. It can be determined whether the driver will avoid an identified risk at a current location of the vehicle. Such a determination can be based on the past driving behavior of the driver and/or a general driving behavior of one or more other drivers. It can be determined whether to present an alert about the identified risk based on whether the driver will avoid the identified risk. In response to determining to that an alert about the identified risk should be presented, an intensity level for the alert can be determined. The alert can be caused to be presented to the driver at the determined intensity level.

20 Claims, 4 Drawing Sheets

(51) Int. Cl.
 *G06V 20/59* (2022.01)
 *G06V 40/16* (2022.01)

(56) References Cited

U.S. PATENT DOCUMENTS

| | | | | |
|---|---|---|---|---|
| 2017/0113683 | A1* | 4/2017 | Mudalige | B60W 30/18145 |
| 2017/0186320 | A1* | 6/2017 | Lai | G08G 1/012 |
| 2017/0247031 | A1* | 8/2017 | Feit | G06V 20/597 |
| 2017/0305434 | A1* | 10/2017 | Ratnasingam | G06N 20/00 |
| 2017/0355377 | A1* | 12/2017 | Vijaya Kumar | B60W 40/08 |
| 2018/0029612 | A1* | 2/2018 | Tsuyunashi | B60W 30/095 |
| 2018/0052458 | A1* | 2/2018 | Tsuji | B60W 30/143 |
| 2018/0060970 | A1* | 3/2018 | Oduor | G06Q 40/08 |
| 2018/0061237 | A1* | 3/2018 | Erickson | G08G 1/0112 |
| 2018/0075309 | A1* | 3/2018 | Sathyanarayana | G05D 1/0055 |
| 2018/0362031 | A1* | 12/2018 | Chang | B60W 30/18163 |
| 2019/0072968 | A1* | 3/2019 | Will, IV | G08G 1/0129 |
| 2019/0202477 | A1* | 7/2019 | Kapuria | G06V 20/59 |
| 2020/0122741 | A1* | 4/2020 | Kuehnle | B60W 50/085 |
| 2020/0269867 | A1* | 8/2020 | Hua | B60W 40/09 |
| 2021/0039639 | A1* | 2/2021 | Song | G06K 9/325 |
| 2021/0107501 | A1* | 4/2021 | Monteil | A61B 5/6893 |
| 2021/0197849 | A1* | 7/2021 | Tsuji | B60W 40/08 |
| 2022/0135027 | A1* | 5/2022 | Bravi | G06T 7/246 |
| | | | | 701/119 |
| 2023/0154204 | A1* | 5/2023 | Kahn | B60W 50/14 |
| | | | | 382/104 |

* cited by examiner

BEHAVIOR-BASED VEHICLE ALERTS

FIELD

The subject matter described herein relates in general to vehicles and, more particularly, to an alert system for a vehicle.

BACKGROUND

Some vehicles are equipped with an alert system that detects dangerous situations in the surrounding environment and provides an alert. An alert can be used for various purposes, such as warning a human driver about a potential danger. In some instances, the alert can be used by the human driver in deciding how to operate the vehicle. Alternatively, a vehicle computing system can use the information to determine how to navigate and/or maneuver the vehicle through the surrounding environment.

SUMMARY

In one respect, the subject matter presented herein relates to a behavior-based method for alerting a driver of a vehicle. The method can include determining whether the driver will avoid an identified risk at a current location of the vehicle based on a past driving behavior of the driver and/or a general driving behavior of one or more other drivers. The method can include determining whether to present an alert about the identified risk based on whether the driver will avoid the identified risk. The method can include, responsive to determining to present an alert about the identified risk, determining an intensity level for the alert. The method can include causing an alert to be presented to the driver at the determined intensity level.

In another respect, the subject matter presented herein relates to a behavior-based system for alerting a driver of a vehicle. The system can include one or more sensors configured to acquire sensor data about the vehicle, at least a portion of an external environment of the vehicle, and/or at least a portion of the interior of the vehicle. The system can include a processor operatively connected to the one or more sensors. The processor can be configured to determine whether the driver will avoid an identified risk at a current location of the vehicle based on at least one of the past driving behavior of the driver and a general driving behavior of one or more other drivers. The processor can be configured to determine whether to present an alert about the identified risk based on whether the driver will avoid the identified risk. The processor can be configured to, responsive to determining to present an alert about the identified risk, determine an intensity level for the alert. The processor can be configured to cause an alert to be presented to the driver at the determined intensity level.

In still another respect, the subject matter described herein relates to a computer program product for behavior-based alerting a driver of a vehicle. The computer program product can include a non-transitory computer readable storage medium having program code embodied therein. The program code executable by a processor to perform a method. The method can include determining whether the driver will avoid an identified risk at a current location of the vehicle based on the past driving behavior of the driver and/or a general driving behavior of one or more other drivers. The method can include determining whether to present an alert about the identified risk based on whether the driver will avoid the identified risk. The method can include, responsive to determining to present an alert about the identified risk, determining an intensity level for the alert. The method can include causing an alert to be presented to the driver at the determined intensity level.

DETAILED DESCRIPTION

Figure 1:
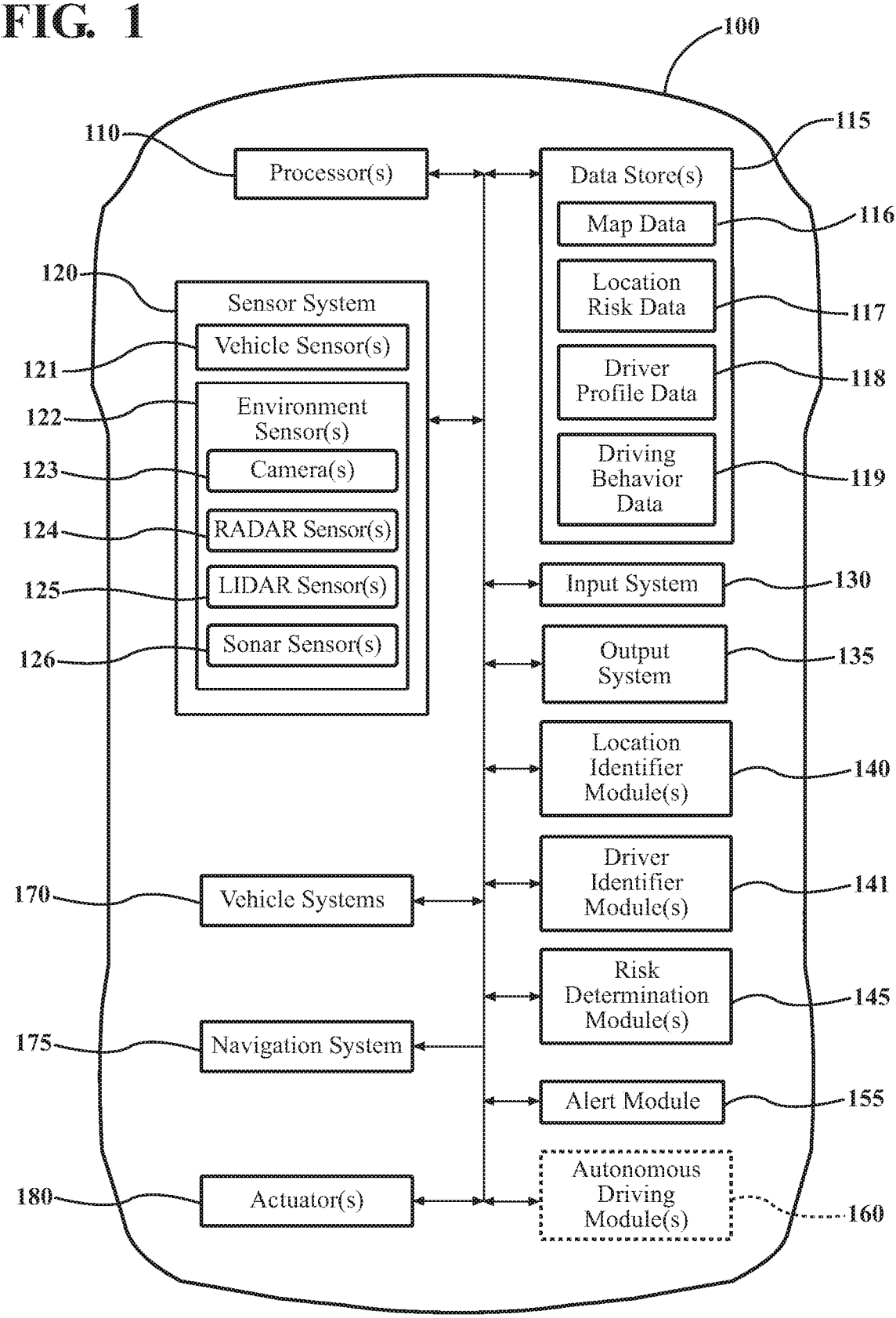
FIG. 1 is an example of a vehicle.

In some conditions, an alert system in a vehicle provides an alert based on a detected risk or danger, and the intensity of the alert may vary with the detected risk. However, a driver of the vehicle may already be aware of the detected risk and may be operating the vehicle so as to avoid the risk or danger. In such a case, providing an alert may be redundant and the intensity of the alert may not correspond to the driver's behavior. For instance, the driver may successfully drive into a parking garage with a narrow entrance regularly, however, the alert system may provide a high alert based on the vehicle's proximity to an edge of the entrance without considering that the driver drives through the narrow entrance without incident regularly.

Arrangements presented herein are directed to the providing of an alert to a vehicle driver based on a detected risk, the driver's driving behavior, and/or a general driving behavior in substantially the same or similar situations. Arrangements described herein can also vary the intensity of the alert driver based on a detected risk, the driver's driving behavior, and/or a general driving behavior in substantially the same or similar situations.

The detected risk may be a collision at a drive-through lane, a busy intersection, a parking garage, a highway ramp, etc. The driver's driving behavior may include the driver's current behavior (e.g., the direction the driver is facing, the steering angle, the speed of the vehicle, etc.). The driver's current behavior may be defined by the driver's instantaneous actions at a moment in time and/or the driver's continuous actions over time. The driver's driving behavior may also include past driving behaviors. For instance, past driving behaviors can include whether the driver successfully avoided similar risks. The general driving behavior may include other drivers' behaviors in the substantially the same or similar situations and whether they successfully avoided substantially the same or similar risks.

The system can detect the driver and the location of the vehicle using sensors. The system can identify the risks at the detected location and can predict whether the driver can successfully avoid the risk based on the driver's behavior and a general behavior of other drivers. Upon determining that driver may not successfully avoid the risk, the system can provide an alert where the intensity of the alert can vary based on the driver's behavior.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

In one or more arrangements, the vehicle 100 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the vehicle 100 can be highly automated or completely automated.

The vehicle 100 can have a plurality of autonomous and/or semi-autonomous operational modes.

The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode.

The vehicle 100 can be configured to be switched between the various operational modes, including between any of the above-described operational modes in any suitable manner, now known or later developed.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements may be shown as being located on or within the vehicle 100 in FIG. 1, it will be understood that one or more of these elements can be located external to the vehicle 100. Thus, such elements are not located on, within, or otherwise carried by the vehicle 100. Further, the elements shown may be physically separated by large distances. Indeed, one or more of the elements can be located remote from the vehicle 100.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, one or more processors 110 can be a main processor(s) of the vehicle 100. For instance, one or more processors 110 can be electronic control unit(s) (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact. In one or more arrangements, the one or more data stores 115 can be located onboard the vehicle 100, on other vehicles that the vehicle 100 can interact with via vehicle-to-vehicle (V2V) communications, on a remote server, and/or on infrastructure that the vehicle 100 can interact with via vehicle-to-infrastructure (V2I) communication, just to name a few possibilities.

In one or more arrangements, the one or more data stores 115 can include map data 116. The map data 116 can include maps of one or more geographic areas. In some instances, the map data 116 can include information or data on roads, traffic control devices, road markings, medians, street lights, structures, features, parking lots, shopping malls, buildings, houses, drive-thru lanes, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, positions, coordinates, and/or information for one or more items included in the map data 116 and/or relative to other items included in the map data 116. The map data 116 can include a digital map with information about road geometry. In one or more arrangements, the map data 116 can include information about the ground, terrain, roads, surfaces, and/or other features of one or more geographic areas. The map data 116 can include elevation data in the one or more geographic areas. The map data 116 can define one or more ground surfaces, which can include paved roads, unpaved roads, land, and other things that define a ground surface. The map data 116 can be high quality and/or highly detailed.

The one or more data stores 115 can include location risk data 117. The location risk data 117 can include risks at an identified location. In some instances, the location risk data 117 can include the location and each known and/or detected risk at the location. For instance, the location risk data may include a physical address, GPS coordinates, and/or one or more types of risks (e.g., a narrow drive-through lane, a busy intersection, or a tight parking structure/space). In the case where the risk is seasonal and/or time specific, the location risk data may include the relevant seasons and/or times. The location risk data 117 can be in any suitable form. The location risk data 117 can be high quality and/or highly detailed.

The one or more data stores 115 can include driver profile data 118. The driver profile data 118 can include driver identifying information. In some instances, the driver profile data 118 can include biometric information for each driver of the vehicle 100. For instance, the driver profile data may include a driver's facial feature data, height data, weight data, fingerprint data, retinal data, iris data, facial data, palm data, and/or voice data. Additional examples of driver profile data 118 can include a pressure profile of a person sitting in the driver seat and/or a seat adjustment profile. Still further examples of driver profile data 118 can include a name, username, password, code, and/or other input received from the driver, such as through an in-vehicle user-interface. Yet another example of driver profile data 118 is a mobile device (e.g., mobile phone, tablet computer, laptop computer, key fob, etc.) associated with a particular person. The driver profile data can include a driving style of the driver (e.g., aggressive, normal, conservative, etc.).

The one or more data stores 115 can include driving behavior data 119. The driving behavior data 119 can include driving behaviors for one or more drivers in one or more locations. More specifically, the driving behavior data 119 may include historical records of a specific driver driving at or within a specific location or region, a specific driver driving through locations with similar characteristics, multiple drivers driving at or near a specific location or region, and multiple drivers driving in locations with similar characteristics. The driving behavior data 119 can further include success rates (e.g., the number of times that a detected risk has been successfully traversed), the level of expertise of the driver, the type of vehicle being driven, etc.

The driving behavior data can include instantaneous driving behavior data and/or continuous driving behavior data. Instantaneous driving behavior data can include data about driving behavior in an instant in time (e.g., vehicle steering wheel being positioned at a certain angle at a certain location during the maneuver or the distance between the vehicle wheel and a barrier at a certain location during the maneuver). Continuous driving behavior data can occur over a period of time such as the vehicle slowing down or the steering wheel turning. Continuous driving behavior data can be continuous or a series of instantaneous readings over time.

The historical record of a specific driver driving through a specific location may include various types of information. Non-limiting examples of such information includes the specific driver and the specific location, the number of times the specific driver has driven past that specific location, the number of times the specific driver has successfully avoided a risk at the specific location, and the number of times the specific driver failed to successfully avoid a risk at the specific location (e.g., colliding with an object, scratching a side of the vehicle, etc.).

The historical record of a specific driver driving through a location with similar characteristics can include information on the specific driver and the locations with similar characteristics, e.g., similar drive-through lanes at different restaurants/locations, and parking structures with similar layouts (e.g., narrow driveways and narrow parking spots). The number of times the specific driver has maneuvered past each location with similar characteristics, the number of times the specific driver has successfully avoided a risk at each location, the number of times the specific driver has failed to successfully avoid a risk at each location (e.g., colliding with an object, scratching a side of the vehicle, etc.).

The historical record of multiple drivers driving through a specific location may include information on the multiple drivers and the specific location. In other words, records of other drivers that have driven through that specific location. The drivers may be uncategorized without any distinction between the drivers. Alternatively, the drivers may be categorized based on, for example, driving style, driving expertise, years of driving experience. The historical record may include the number of times each driver has driven past that specific location, the number of times each driver has successfully avoided a risk at the specific location, the number of times each driver has failed to successfully avoid a risk at the specific location (e.g., colliding with an object, scratching a side of the vehicle, etc.).

The historical record of multiple drivers driving through a location with similar characteristics may include information on the multiple drivers and the locations with similar characteristics, as described above. The number of times each driver has maneuvered past each location with similar characteristics, the number of times each driver has successfully avoided a risk at each location, the number of times each driver has failed to successfully avoid a risk at each location (e.g., colliding with an object, scratching a side of the vehicle, etc.).

In some instances, at least a portion of the map data 116, the location risk data 117, driver profile data 118, and/or the driving behavior data 119 can be located in one or more data stores 115 located onboard the vehicle 100. Alternatively or in addition, at least a portion of the map data 116, the location risk data 117, driver profile data 118, and/or the driving behavior data 119 can be located in one or more data stores 115 that are located remote from the vehicle 100, such as on a remote server communicatively linked to the vehicle 100 through one or more communication networks. As an example, at least a portion of the map data 116, the location risk data 117, driver profile data 118, and/or the driving behavior data 119 can be located in one or more data stores 115 on a cloud-based server. The map data 116, the location risk data 117, driver profile data 118, and/or the driving behavior data 119 can be obtained by the vehicle 100 from any suitable source, including a vehicle manufacturer or other entity and/or based on test data, just to name a few possibilities.

The elements of the vehicle 100 can be communicatively linked through one or more communication networks. As used herein, the term "communicatively linked" can include direct or indirect connections through a communication channel or pathway or another component or system. A "communication network" means one or more components designed to transmit and/or receive information from one source to another. One or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

As noted above, the vehicle 100 can include the sensor system 120. The sensor system 120 can include one or more sensors. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can detect, determine, assess, monitor, measure, quantify and/or sense information about the vehicle 100 itself (e.g., position, orientation, speed, steering angle, path, elevation, location, etc.).

Alternatively or in addition, the sensor system 120 can include one or more environment sensors 122 configured to detect, determine, assess, monitor, measure, quantify, acquire, and/or sense driving environment data. "Driving environment data" includes data or information about the external environment in which a vehicle is located or one or more portions thereof. For example, the one or more environment sensors 122 can detect, determine, assess, monitor, measure, quantify, acquire, and/or sense obstacles in at least a portion of the external environment of the vehicle 100 and/or information/data about such obstacles. Such obstacles may be stationary objects and/or dynamic objects. The one or more environment sensors 122 can detect, determine, assess, monitor, measure, quantify, acquire, and/or sense other things in the external environment of the vehicle 100, such as, for example, lane markers, signs, traffic lights, traffic signs, lane lines, crosswalks, curbs proximate the vehicle 100, off-road objects, etc.

In one or more arrangements, the environment sensors 122 can include one or more cameras 123, one or more radar sensors 124, one or more lidar sensors 125, and/or one or more sonar sensors 126. Such sensors can be used to detect, determine, assess, monitor, measure, quantify, acquire, and/or sense, directly or indirectly, something about the external environment of the vehicle 100. For instance, one or more of the environment sensors 122 can be used to detect, determine, assess, monitor, measure, quantify, acquire, and/or sense, directly or indirectly, the presence of one or more obstacles in the external environment of the vehicle 100, the position or location of each detected obstacle relative to the vehicle 100, the distance between each detected obstacle and the vehicle 100 in one or more directions (e.g., in a longitudinal direction, a lateral direction, and/or other direction(s)), the elevation of each detected obstacle, the speed of each detected obstacle and/or the movement of each detected obstacle.

The vehicle 100 can include an input system 130. An "input system" includes any device, component, system, element or arrangement or groups thereof that enable information/data to be entered into a machine. The input system 130 can receive an input from a vehicle occupant (e.g., a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle occupant (e.g., a person, a vehicle occupant, etc.). The output system 135 can present information/data to a vehicle occupant. The output system 135 can include a display for visual outputs. The output system 135 may include an earphone and/or speaker for audio outputs. The output system 135 may include vibrating mechanisms located in, e.g., the steering wheel, the vehicle seat, for haptic outputs. Some components of the vehicle 100 may serve as both a component of the input system 130 and a component of the output system 135.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more location identifier modules 140. The location identifier module(s) 140 can be configured to analyze data/information acquired by the sensor system 120 (e.g., camera data, radar data, lidar data, sonar data, etc.). The location identifier module(s) 140 can detect the location of a vehicle based on the acquired sensor data (e.g., driving environment data). The location identifier module(s) 140 can compare the acquired sensor data to the map data 116 to identify the vehicle's location. Alternatively, the location can be identified based on the navigation system 175 (e.g., a global positioning system (GPS)).

The vehicle 100 can include one or more driver identifier modules 141. The driver identifier module(s) 141 can be configured to analyze data/information acquired by the sensor system 120. The driver identifier module(s) 141 can be configured to detect and/or identify a driver in the vehicle 100 based on the acquired sensor data (e.g., vehicle camera data). A driver may be detected by detecting the driver's face (e.g., using a camera and face recognition mechanisms), the driver's voice (e.g., using a microphone and voice recognition mechanisms), the driver's biometric(s), and/or by identifying the driver using an input code, a QR code, a personalized key, etc. The driver identifier module(s) 141 can detect the driver using any suitable technique, including, for example, biometric analysis, signal analysis, template matching and other kinds of computer vision and/or image processing techniques and/or other artificial or computational intelligence algorithms or machine learning methods.

The driver identifier module(s) 141 can include and/or have access to the driver profile data 118. The driver identifier module(s) 141 can also include any suitable software for driver recognition. In one or more arrangements, the driver identifier module(s) 141 can compare acquired sensor data to one or more driver profiles to identify the driver in the vehicle 100.

The driver identifier module(s) 141 can query, analyze, search, and/or review the driver profile data 118 for possible matches with the acquired sensor data. In one example, the driver profile data 118 can be compared to the acquired sensor data for possible matches. Alternatively or in addition, measurements or other aspects of the driver captured by the sensor system 120 can be compared to measurements or other aspects of the driver profile data 118. As another example, the driver may input identifying information such as a username and password. The driver identifier module(s) 141 can identify the detected driver as a specific person if there is a match between the detected driver and the driver profile data 118.

In instances in which there is no match between the detected driver and the driver profile data 118, the driver identifier module(s) 141 can be configured to set up and initialize a new driver profile for the detected driver. The new driver profile can be added to the driver profile data 118.

The vehicle 100 can include one or more risk determination modules 145. The risk determination module(s) 145 can be configured to analyze data/information acquired by the sensor system 120 (e.g., camera data, radar sensor data, lidar sensor data, sonar sensor data, etc.) about the driving environment, as well as data/information in the location risk data 117, driver profile data 118, and the driving behavior data 119. Based on the analyzed data, the risk determination module 145 can determine there is a risk in the current driving environment and whether an alert is required to warn the driver of the risk.

The risk determination module(s) 145 can identify risks at the identified location based on the location risk data 117. The risk determination module(s) 145 can acquire the driving behavior of the specific driver, if available, and the driving behavior of other drivers in substantially the same or similar situations from the driving behavior data 119. The risk determination module(s) 145 may determine, based on the acquired driving behaviors, whether the risk at the identified location can be easily overcome. As an example, the risk determination module(s) 145 can retrieve information from the driving behavior data 119 that indicates that the specific driver traverses a narrow fast food restaurant drive-through successfully and without incident 100% of the time, and as such, the risk determination module(s) 145 may conclude that the determined risk is easily overcome and an alert is not required. As another example, if the specific driver has never travelled through a specific location before, the risk determination module(s) 145 may determine the ease of successfully avoiding the determined risk at the specific location using, if available, the driving behavior of the specific driver at similar locations, the driving behavior of other drivers at the specific location, and/or the driving behavior of other drivers at similar locations. The risk determination module(s) 145 may analyze the number of times the specific location or similar locations were successfully traversed without incident. If the number of times exceeds a predetermined threshold, the risk determination module(s) 145 may determine an alert is not required or a reduced alert level is required. However, if the number of times falls below a predetermined threshold, the risk determination module(s) 145 may determine an alert is required. Accordingly, if the risk determination module(s) 145 determines, based on the driving behavior data 119, the specific driver always or frequently has difficulty avoiding a risk at a specific location or at similar location, the risk determination module(s) 145 may determine that an elevated alert level is required. In some arrangements, the terms "reduced" or "elevated" can refer to a predetermined level of alert. In some arrangements, the terms "reduced" or "elevated" can be relative to the standard or typical alert that the vehicle would present for a given risk or situation.

The risk determination module(s) 145 may also determine whether the specific driver can successfully avoid a risk based on the driver's instant and/or continuous behavior. As an example, if the risk determination module 145 detects the steering angle is positioned such that the vehicle 100, continuing on at that steering angle, may collide with an object (a side wall, a median, etc.), the risk determination module 145 may determine an alert is required. As another example, if the risk determination module 145 detects that the vehicle 100 is not slowing down at a predetermined distance from an intersection, the risk determination module 145 may determine an alert is required. In a case where the risk determination module 145 determines that other drivers tend to have difficulty at a specific or similar location, the risk determination module 145 may determine an alert is required. The risk determination module 145 may determine whether the specific driver requires an alert based on any combination of the sensor data, the location risk data, the driver profile data and/or the driving behavior data and any other suitable information.

The risk determination module(s) 145 can also include a predictive aspect. For example, the risk determination module(s) 145 can determine that normally in this location, under these conditions, and/or for this type of risk, the driver would not behave improperly. Thus, when the driver encounters the same or similar scenario, the risk determination module(s) 145 can predict that the driver will behave properly.

The risk determination module 145 may further determine the intensity of the alert. Each risk may have an associated level of importance, and the intensity of the alert can be tailored to the level of importance. For instance, collisions can represent a high level of importance. However, according to arrangements described herein, the risk determination module 145 can vary the intensity of an alert based on the specific driver's driving behavior as well as the general driving behavior.

In the case of the alert being an audio alert, the risk determination module 145 may determine the volume and/or pitch of the audio alert. In the case of a visual alert, the risk determination module 145 may determine the brightness, color, and/or size of the visual alert. In the case of a haptic alert, the risk determination module 145 may determine the rate of vibration, the range of motion. The risk determination module 145 may determine the driver's driving behavior and select an appropriate intensity. As an example, the risk determination module 145 may reduce or increase the intensity of an alert based on the driver's past driving record. For instance, the risk determination module 145 may determine that the driver successfully avoids the risk at a specific location regularly, and as such, the intensity of the alert may be reduced. In another instance, the risk determination module 145 may determine that the driver does not consistently avoid the risk at a specific location, and as such, the intensity of the alert may be increased.

The intensity of the alert may be determined based on the specific driver's driving behavior as well as the general driving behavior. For instance, if the driving behavior of the specific driver and other drivers indicate that the risk at a specific location (or at similar locations) is rarely avoided, the intensity of the alert may be high. In another instance, if the driving behavior of the specific driver and other drivers indicate that the risk at a specific location (or at similar locations) is regularly avoided, the intensity of the alert may be low. In another instance where the driving behavior of the specific driver indicates that the driver regularly avoids the risk and the general driving behavior indicates that other drivers rarely avoid the risk, the risk determination module(s) 145 may use a weighting algorithm to determine the intensity of the alert. Similarly, in an instance where the driving behavior of the specific driver indicates that the driver rarely avoids the risk and the general driving behavior indicates that other drivers regularly avoid the risk, the risk determination module(s) 145 may use a weighting algorithm to determine the intensity of the alert.

The risk determination module (s) 145 can determine the ease of avoiding a risk, whether an alert is required and the intensity of the alert using any suitable technique, including, artificial or computational intelligence algorithms or machine learning methods.

The vehicle 100 can include one or more alert modules 150. The alert module(s) 150 can cause an alert, message, warning, and/or notification to be presented within the vehicle 100. The alert module(s) 150 can cause any suitable type of alert, message, warning, and/or notification to be presented, including, for example, visual, audial, and/or haptic alert, just to name a few possibilities. The alert module(s) 150 can be operatively connected to the output system 135, one or more vehicle systems 170, and/or components thereof to cause the alert to be presented.

In one or more arrangements, the alert module(s) 150 can cause a visual warning to be presented. "Visual warning" is any output that provides an alert or warning in a manner that is perceptible to the human sense of sight. The visual warning can be presented by one or more components of the output system 135, such as on one or more displays or one or more lights. The visual warning can have any suitable form. In one or more arrangements, the visual warning can include one or more words, one or more phrases, one or more symbols, one or more pictures, and/or one or more messages. The level of the alert such as size, color, brightness, etc. can vary based on the determined alert level.

In one or more arrangements, the alert module(s) 150 can cause an audial warning to be presented. "Audial warning" is any output that provides an alert or warning in a manner that is perceptible to the human sense of hearing. The audial warning can be presented by one or more components of the output system 135, such as by being emitted over one or more speakers. The audial warning can have any suitable form. The audial warning can include one or more sounds, one or more words, one or more phrases, and/or one or more messages. The level of the alert such as the volume, pitch, length of the alert/warning, etc. can vary based on the determined alert level. Further, various types of audial warnings can be given, such as a message, a beep, or a siren.

In some arrangements, the vehicle 100 can include one or more autonomous driving modules 160. The autonomous driving module(s) 160 can receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can receive, capture, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 160 can determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can execute various vehicle functions and/or to transmit data to, receive data from, interact with, and/or control the vehicle 100 or one or more systems thereof (e.g., one or more of vehicle systems 170).

The vehicle 100 can include one or more vehicle systems 170. The one or more vehicle systems 170 can include a propulsion system, a braking system, a steering system, throttle system, a transmission system, a signaling system, and/or a navigation system 175. Each of these systems can include one or more mechanisms, devices, elements, components, systems, and/or combination thereof, now known or later developed. The above examples of the vehicle systems 170 are non-limiting. Indeed, it will be understood that the vehicle systems 170 can include more, fewer, or different vehicle systems. It should be appreciated that although particular vehicle systems are separately defined, each or any of the systems or portions thereof may be otherwise combined or segregated via hardware and/or software within the vehicle 100.

The navigation system 175 can include one or more mechanisms, devices, elements, components, systems, applications and/or combinations thereof, now known or later developed, configured to determine the geographic location of the vehicle 100 and/or to determine a travel route for the vehicle 100. The navigation system 175 can include one or more mapping applications to determine a travel route for the vehicle 100. The navigation system 175 can include a global positioning system, a local positioning system, or a geolocation system.

In one or more arrangements, the navigation system 175 can include a global positioning system, a local positioning system or a geolocation system. The navigation system 175 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 175 can use Transmission Control Protocol (TCP) and/or a Geographic information system (GIS) and location services.

The navigation system 175 may include a transceiver configured to estimate a position of the vehicle 100 with respect to the Earth. For example, navigation system 175 can include a GPS transceiver to determine the vehicle's latitude, longitude and/or altitude. The navigation system 175 can use other systems (e.g., laser-based localization systems, inertial-aided GPS, and/or camera-based localization) to determine the location of the vehicle 100.

The processor(s) 110 and/or the autonomous driving module(s) 160 can be operatively connected to communicate with the various vehicle systems 170 and/or individual components thereof. For example, returning to FIG. 1, the processor(s) 110 and/or the autonomous driving module(s) 160 can be in communication to send and/or receive information from the various vehicle systems 170 to control the movement, speed, maneuvering, heading, direction, etc. of the vehicle 100. The processor(s) 110 and/or the autonomous driving module(s) 160 may control some or all of these vehicle systems 170 and, thus, may be partially or fully autonomous.

For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 180 to modify, adjust and/or alter one or more of the vehicle systems 170 or components thereof to responsive to receiving signals or other inputs from the processor(s) 110 and/or the autonomous driving module(s) 160. The one or more actuators 180 can include motors, pneumatic actuators, hydraulic pistons, relays, solenoids, and/or piezoelectric actuators, just to name a few possibilities.

Now that the various potential systems, devices, elements and/or components of the vehicle 100 have been described, various methods will now be described. Various possible steps of such methods will now be described. The methods described may be applicable to the arrangements described above in relation to FIG. 1, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 2:
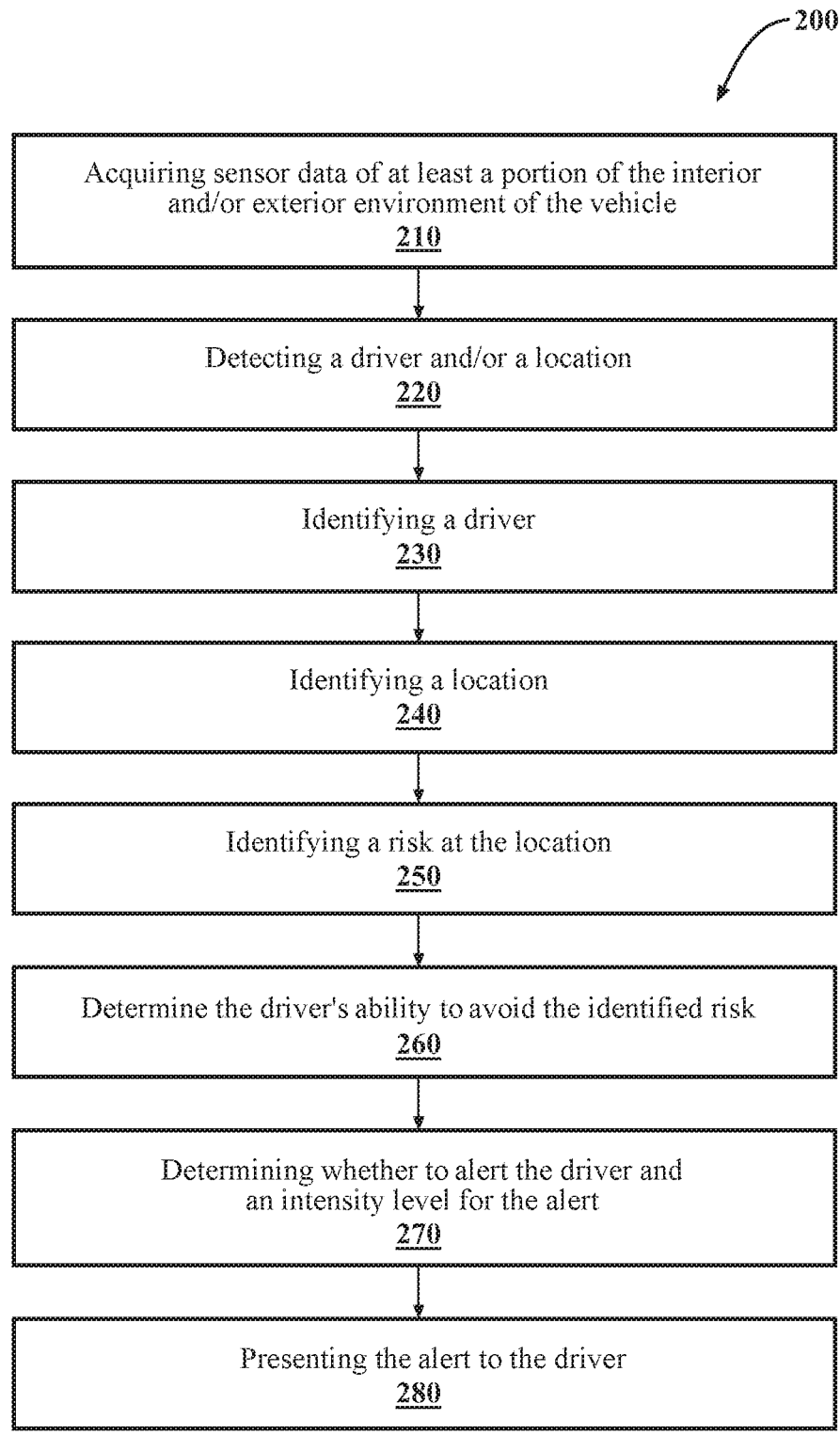
FIG. 2 is an example of a method of providing an alert to a vehicle driver.

Referring now to FIG. 2, an example of a method 200 of providing an alert to a vehicle driver is shown. At block 210, sensor data of at least a portion of the interior and/or exterior environment of the vehicle 100 can be acquired by one or more sensors. In some instances, the one or more sensors can be located onboard the vehicle 100. In some instances, one or more of the sensors may not be located on, in, or otherwise carried by the vehicle 100. Such acquiring can be performed by one or more of the environment sensors 122. As an example, the camera(s) 123, the radar sensor(s) 124, the lidar sensor(s) 125, the sonar sensor(s) 126, or any combination thereof can be used to acquire sensor data. The method 200 can continue to block 220.

At block 220, a driver and/or a vehicle location can be detected based on the acquired sensor data. For instance, the acquired sensor data can be analyzed by the sensor system 120, the processor(s) 110, the driver identifier module(s) 141, the location identifier module(s) 140, and/or one or more modules(s) to detect the driver and/or the location of the vehicle. The method 200 can continue to block 230.

At block 230, the driver can be identified based on the acquired sensor data and the driver profile data 118. For instance, the acquired sensor data can be analyzed by the sensor system 120, the processor(s) 110, the driver identifier module(s) 141 and/or one or more other modules(s) to identify the detected driver. Further, the acquired sensor data can be compared and/or analyzed relative to the driver profile data 118. The method 200 can continue to block 240.

At block 240, the vehicle location can be identified. As an example, the vehicle location can be identified based on the acquired sensor data, navigation system data, and/or the map data 116. For instance, the acquired sensor data and/or navigation system data can be analyzed by the sensor system 120, the processor(s) 110, the location identifier module(s) 140, and/or one or more other modules(s) to identify the detected vehicle location. Further, the acquired sensor data can be compared and/or analyzed relative to the map data 116. The method 200 can continue to block 250.

At block 250, the risks at the vehicle location can be identified based on the acquired sensor data and the location risk data 117. For instance, the acquired sensor data and/or the location risk data 117 can be analyzed by the sensor system 120, the processor(s) 110, the location identifier module(s) 140, risk determination module(s) 145, and/or one or more other modules(s) to identify the navigational challenge. The method 200 can continue to block 260.

At block 260, the driver's ability to successfully avoid the identified risks can be determined based on the driving behaviors of the driver and other drivers in the vehicle location and/or locations with similar risks. For instance, the driving behaviors of the drivers can be analyzed by the sensor system 120, the processor(s) 110, the risk determination module(s) 145, and/or one or more other modules(s) to determine whether the driver can successfully avoid the risk without intervention. The method 200 can continue to block 270.

At block 270, it can be determined whether an alert is needed and, if so, the appropriate intensity of the alert can be determined. Such a determination can be made based on the driving behavior data 119 and location risk data 117. For instance, the driving behaviors of the drivers and/or the location risk data can be analyzed by the sensor system 120, the processor(s) 110, the risk determination module(s) 145, and/or one or more other modules(s) to determine the need for an alert and the intensity of alert required. The method 200 can continue to block 280.

At block 280, an alert can be output based on the determined need for the alert and the determined intensity of the alert. For instance, the processor(s) 110, the risk determination module(s) 145, and/or other module(s) can analyze the determined need and intensity, and output the alert based on the determined need and intensity.

The method 200 can end. Alternatively, the method 200 can return to block 210 or some other block.

When a risk is identified, there are various things that can be done. As an example, in some instances, the vehicle 100 can be an autonomous vehicle or a semi-autonomous vehicle. In such cases, the method 200 can include determining a driving maneuver for the vehicle 100 based at least partially on the risk. For instance, the driving maneuver may be reducing the speed of the vehicle 100 to a reduced speed until the location having the risk has been traversed and there is no longer a collision risk. As another example, the driving maneuver can be a steering of the vehicle 100 in one or more directions to avoid a collision with an object. As still another example, the driving maneuver can be braking or coming to a stop. The driving maneuver can be determined by the processor(s) 110 and/or the autonomous driving module(s) 160. The vehicle 100 can be caused to implement the determined driving maneuver. The vehicle 100 can be caused to implement the determined driving maneuver in any suitable manner. In one or more arrangements, the processor(s) 110 and/or the autonomous driving module(s) 160 can cause the vehicle 100 to implement the driving maneuver. The processor(s) 110 and/or the autonomous driving module(s) 160 can be operatively connected to one or more of the vehicle systems 170 to implement the determined driving maneuver. In one or more arrangements, the processor(s) 110 and/or the autonomous driving module(s) 160 can be operable to control the one or more actuators 180, which can control one or more of the vehicle systems 170 or portions thereof to implement the determined driving maneuver.

In some instances, an alert can be presented within the vehicle 100 when a risk that is not easily avoided is detected as described above. The alert can be any type of alert. By providing an alert, the driver (or any vehicle occupant) can be alerted to the presence of the risk, which the driver (or vehicle occupant) may or may not be aware of.

In some instances, the vehicle 100 can communicate the identification of a risk with other devices in the external environment, such as other vehicles and/or infrastructure. In some instances, the vehicle 100 can receive risk and/or driver behavior information from other devices in the external environment, such as other vehicles and/or infrastructure. Vehicle-to-vehicle (V2V) and vehicle-to-infrastructure (V2I) communications can be transmitted according to any suitable wireless communication media, standards, and protocols, now known or later developed. In certain systems, the vehicle 100, the other vehicles, and the infrastructure may include specialized hardware to enable such communications, while in other examples the communication systems can be implemented using existing vehicle hardware components (e.g., radio and satellite equipment, navigation computers). Infrastructure can include non-vehicle receiving devices, for example, toll booths, railroad crossings, and road-side devices. Certain V2V and V2I communication systems may continuously broadcast vehicle operational information from a surrounding vehicle or from any infrastructure device capable of transmitting the information to a vehicle.

Figure 3:
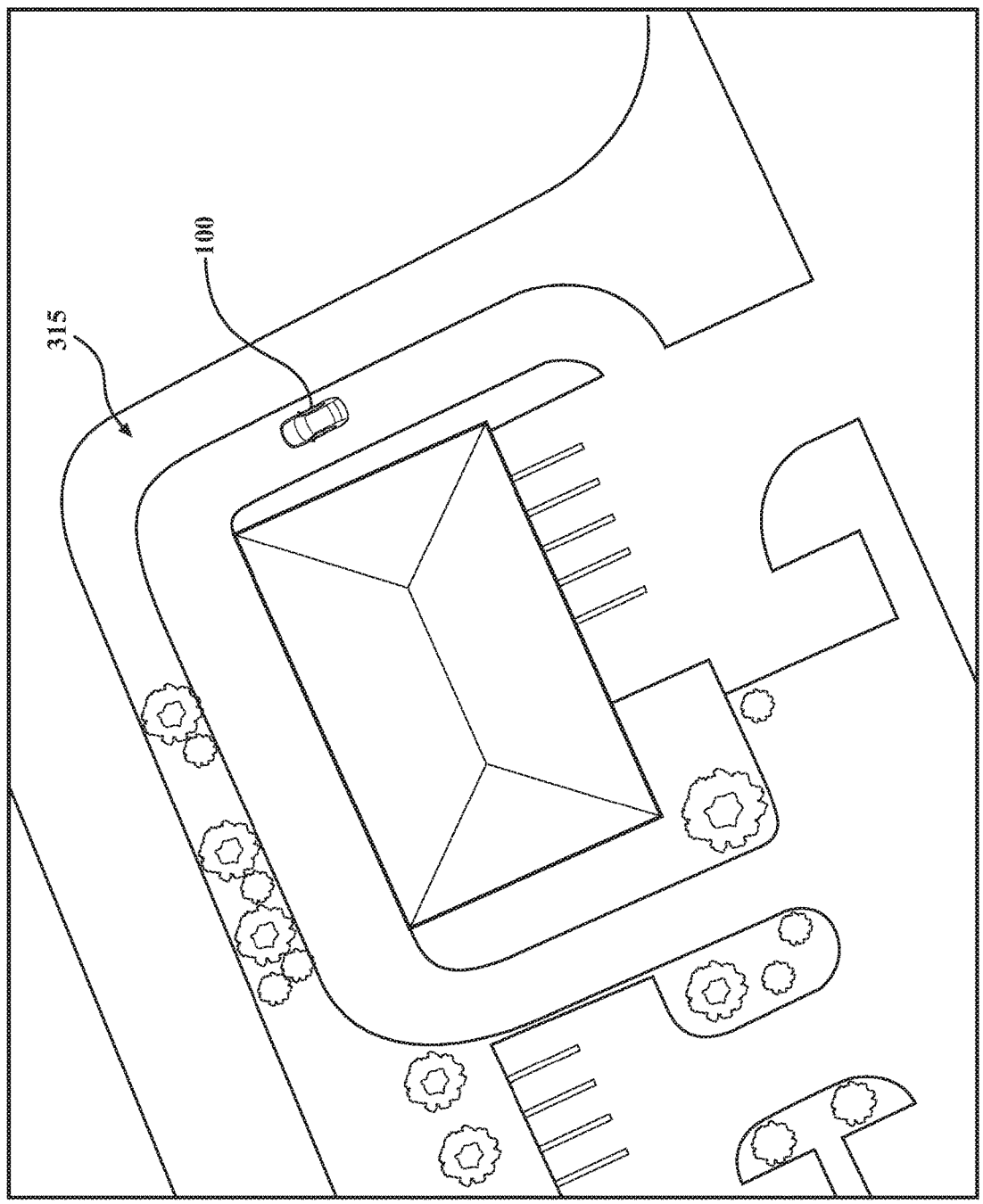
FIG. 3 is an example of a driving scenario in which a vehicle is in a drive-through lane at a fast-food restaurant.

A non-limiting example of the operation of the vehicle 100 and/or the method 200 will now be described in relation to FIG. 3. Referring to FIG. 3, the vehicle 100 can be traveling in an environment 300. For instance, the vehicle 100 may be traveling through a drive-through lane 315. The drive-through lane 315 can be narrow and curved. The drive-through lane 315 can be bounded on both sides with large lane barriers that extend at least a portion of the length of the drive-through lane.

The vehicle 100 can use one or more sensors of the sensor system 120 to acquire sensor data of at least a portion of the interior of the vehicle 100 and the environment. The portion of the interior may include a portion of the interior where a driver may be located. The portion of the environment may include the environment within a predetermined radius around the vehicle. The vehicle 100 can acquire visual data using one or more cameras 123. The acquired visual data can be analyzed by the vehicle 100. The driver may be detected in the interior of the vehicle 100 within the acquired visual data. Alternatively, the driver may be detected outside the vehicle 100 as the driver approaches the vehicle 100. Further, the location of the vehicle 100 may be detected within the acquired visual data. The driver and location may be detected within any suitable sensor data such as voice sensor data, biometric sensor data, camera data, and/or LiDAR sensor data.

The vehicle 100 can identify the driver. The vehicle 100 can do so by comparing the acquired visual data to the driver profile data 118. For instance, the vehicle 100 can compare the acquired visual data to driver profiles in the driver profile data 118. If the acquired visual data substantially matches one of the driver profiles, then the driver can be considered to be identified.

The vehicle 100 can identify the location. The vehicle 100 can do so by comparing the acquired visual data to the map data 116. For instance, the vehicle can compare the acquired visual data to locations in the map data 116. If the acquired visual data substantially matches one of the locations in the map data 116, then the location can be considered to be identified. Alternatively, the location can be identified based on a global positioning system (GPS). For instance, the vehicle 100 can compare GPS coordinates to addresses in the map data 116. If the acquired GPS coordinates substantially matches one of the addresses, then the location can be considered to be identified.

The vehicle 100 can identify one or more risks at the identified location. The vehicle 100 can do so by retrieving the risks associated with the identified location in the location risk data 117. Upon identifying the risks for the identified location, the vehicle 100 can further determine other locations that have similar risks by retrieving other locations associated with a similar identified risk. For instance, in this example, the vehicle 100 may identify the risk at the drive-through as being a narrow drive-through lane 315 with barriers on both sides of the vehicle 100. The vehicle 100 may further determine other locations (e.g., fast food restaurants) that have a drive-through with a narrow lane.

The vehicle 100 can determine the drivers' behaviors at the identified location or at other locations with similar risk. More particularly, the vehicle 100 can determine the behavior of the driver (of the vehicle 100) as well as other drivers that may have driven through the identified location or a location with a similar risk (e.g., the drive-through lane at the same, similar, or other fast-food restaurants). The vehicle 100 may determine the driver's behavior by retrieving the driver's behavior from the driving behavior data 119 using at least, the driver's profile, the identified location, the risk, and other locations with similar risks. Additionally and/or alternatively, the vehicle 100 may determine the driver's behavior based on the driver's current behavior, which may be instant such as the angle of the steering wheel or may be constant such as the driver slowing down.

The vehicle 100 can determine the other drivers' behaviors by retrieving these behaviors from the driving behavior data 119 using at least, the identified location, the risk, and other locations with similar risks.

The vehicle 100 can analyze the behaviors of the driver(s) (the identified driver and/or other drivers) to determine whether the drivers will successfully overcome the risk at the identified location or similar risks at other locations. The vehicle 100 may do so by comparing the number of times that the drivers have successfully overcome the risk or a similar risk to a predetermined threshold. In this example, the vehicle 100 can measure the number of times that drivers driving through the drive-through have successfully driven through without colliding with the barriers. In the case that the number of times is above a predetermined threshold, e.g., nine times out of ten, then the vehicle 100 may determine that an alert is not required.

The vehicle 100 can determine that an alert is required when the number of times that drivers successfully overcame a risk, in this case, at the drive-through, is below a predetermined threshold. Further, the vehicle 100 may determine drivers' (both the specific driver and other drivers) behaviors. The higher the risk of collision based on drivers' behaviors, the more intense (e.g., the louder, the brighter, or the bolder) the alert.

The vehicle 100 may output an alert which may be a visual alert, audio alert, and/or a haptic alert. In one or more arrangements, the vehicle 100 can cause an alert to be presented within the vehicle 100. Such an alert can warn the driver as to the risk of collision. In one or more arrangements, when the vehicle 100 is an autonomous vehicle, the vehicle 100 can determine a driving maneuver relative to the barrier. For instance, the vehicle 100 can determine one or more steering and/or braking maneuvers to avoid a collision with the barrier 330.

The vehicle 100 can monitor and record the driver's behavior as the driver drives through the drive through and may upload the behavior to the driving behavior data 119.

Figure 4:
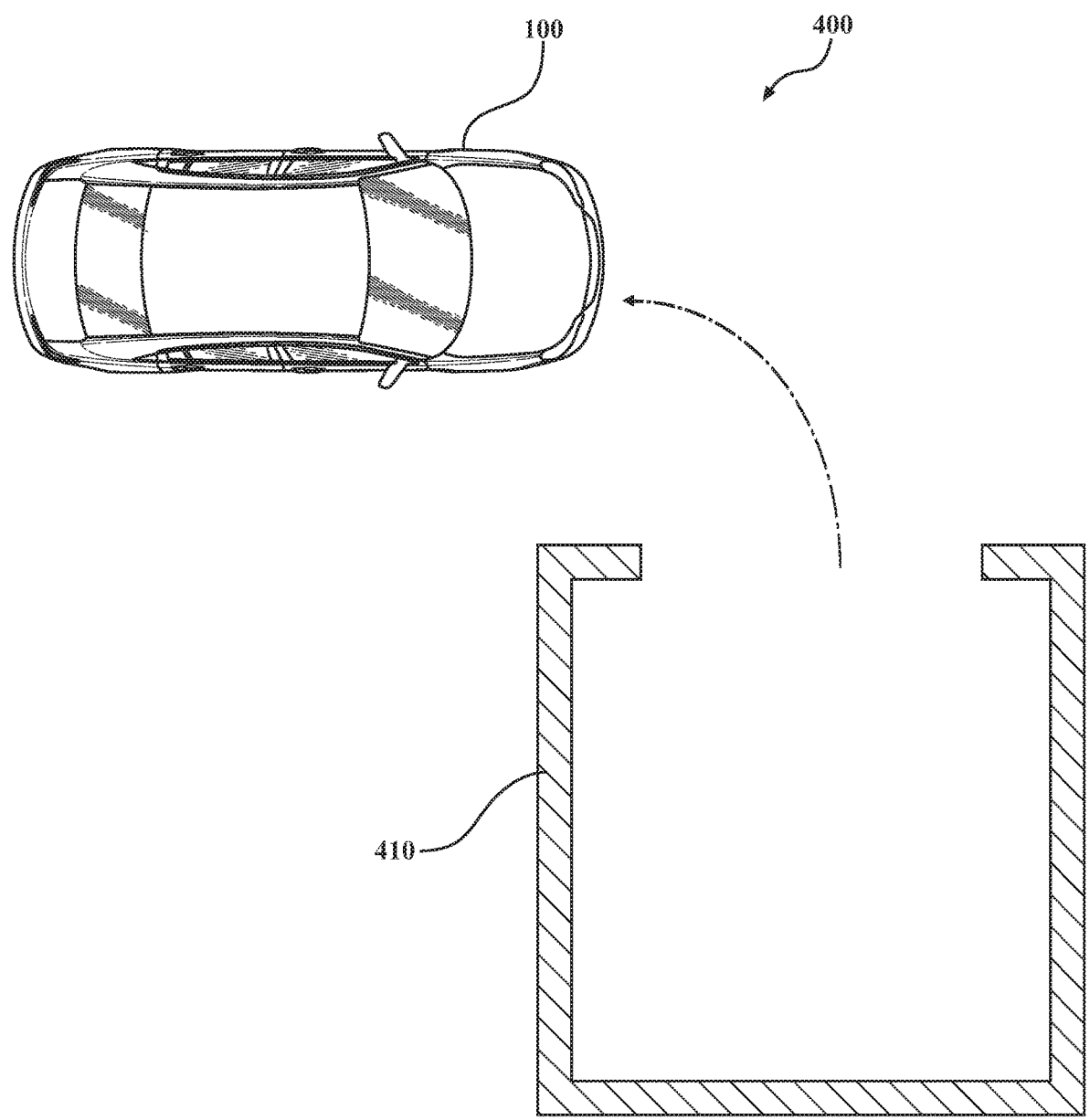
FIG. 4 is an example of a driving scenario in which a vehicle is exiting a residential garage.

Another non-limiting example of the operation of the vehicle 100 and/or the method 200 will now be described in relation to FIG. 4. Referring to FIG. 4, the vehicle 100 is located in an environment 400. The vehicle 100 may be parked inside a garage 410 of the driver's residence. The vehicle 100 may be in the process of reversing out of the garage 410 so as to leave the residence. The exit opening of the garage 410 may be a very tight fit such that a vehicle 100 may be at risk of colliding with a sidewall.

The vehicle 100 can identify the driver and the location as described in the previous example. The vehicle 100 can determine the risk at the location. In this case, one of the risks can be a collision while reversing out of a garage with a narrow exit opening.

The vehicle 100 can determine whether the driver can successfully drive out of the garage 410 without colliding with a sidewall based on the driver's driving behavior. The vehicle 100 can access the driver's driving behavior from the driving behavior data 119. In the case where the garage 410 is located at the driver's residence, the driving behavior data 119 may include a large amount of data relating to the driver's driving behavior when exiting the garage. The vehicle 100 can also determine the driver's behavior based on the driver's current behavior, which may be instant such as the positioning of the vehicle wheels relative to the sidewalls or may be constant such as the driver turning the steering wheel.

The vehicle 100 can compare the number of times that the driver has successfully exited the garage 410 without incident to a predetermined threshold. In the case that the number of times is above a predetermined threshold (e.g., nine times out of ten), then the vehicle 100 may determine that an alert is not required or an alert with a low intensity is needed. In the case that the number of times is below a predetermined threshold (e.g., two times out of ten), then the system may determine that an alert with a high intensity is required.

The vehicle 100 can determine the risk level of a collision. In this case, if, as an example, the driver has historically been successful only two times out of ten, then the risk level of a collision can be determined to be high. The vehicle 100 can output a visual alert such as a flashing message on a display to warn the driver as to the risk of collision.

The vehicle 100 can monitor and record the driver's behavior as the driver exits the garage and may upload the behavior to the driving behavior data 119. It will be appreciated that, while the example of FIG. 4 is described in connection with reversing out of a garage, the above description can also apply to the situation in which a driver is driving forward into the garage.

It should be noted that arrangements described herein can take into account any suitable factors in assessing a driver's behavior, risk at a situation, etc. Examples of other factors include weather and overall driver state of awareness.

It will be appreciated that arrangements described herein can provide numerous benefits, including one or more of the benefits mentioned herein. For example, arrangements described herein can prioritize objection/collision alerts to areas where it has been determined that the driver will likely behave improperly. Arrangements described herein can more finely assess a risk level in a driving situation. Arrangements described herein can improve the efficiency and/or helpfulness of alerts provided to a driver. Arrangements described herein can reduce annoyance to a driver by refraining from presenting an alert or reducing the intensity of an alert when the driver has successfully demonstrated that he or she will behave appropriately in the particular driving scenario or when it is otherwise likely that the driver will behave appropriately in the particular driving scenario.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A behavior-based method for alerting a driver of a vehicle, the method comprising:
　determining whether the driver will avoid an identified risk at a current location of the vehicle based on at least:
　　a past driving behavior of the driver successfully avoiding the identified risk or a similar risk; and
　　a general driving behavior of one or more other drivers that includes a success rate of avoiding the identified risk or a similar risk;
　determining whether to present an alert about the identified risk based on whether the driver will avoid the identified risk;
　responsive to determining to present an alert about the identified risk, determining an intensity level for the alert based on a level of importance associated with the identified risk; and
　causing an alert to be presented to the driver by an output system of the vehicle at the determined intensity level.

2. The method of claim 1, wherein the past driving behavior of the driver includes past driving behavior of the driver at the current location of the vehicle.

3. The method of claim 1, wherein the general driving behavior of one or more other drivers includes driving behavior data of the one or more other drivers at the current location of the vehicle or a location that is similar to the current location of the vehicle.

4. The method of claim 1, wherein the alert is at least one of a visual alert, an audio alert, and a haptic alert.

5. The method of claim 1, wherein determining an intensity level for the alert includes determining a reduced intensity level when the past driving behavior of the driver or a general driving behavior of one or more other drivers indicates a high success rate of avoiding the identified risk.

6. The method of claim 5, wherein the high success rate of avoiding the identified risk includes successful avoidance of the risk for a threshold number of times or a threshold percentage of times.

7. The method of claim 1, wherein determining an intensity level for the alert includes determining an elevated intensity level when the past driving behavior of the driver or a general driving behavior of one or more other drivers indicates a low success rate of avoiding the identified risk.

8. The method of claim 1, further including:
acquiring, using one or more sensors, sensor data of about the driver of the vehicle; and
identifying the driver of the vehicle based on the acquired sensor data.

9. The method of claim 1, further including
determining a current location of the vehicle; and
identifying a risk at the determined current location of the vehicle.

10. A behavior-based system for alerting a driver of a vehicle, the system comprising:
one or more sensors configured to acquire sensor data about at least one of: the vehicle, at least a portion of an external environment of the vehicle, and the driver; and
one or more processors operatively connected to the one or more sensors, the one or more processors being configured to:
determine whether the driver will avoid an identified risk at a current location of the vehicle based on at least:
a past driving behavior of the driver successfully avoiding the identified risk or a similar risk; and
a general driving behavior of one or more other drivers that includes a success rate of avoiding the identified risk or a similar risk;
determine whether to present an alert about the identified risk based on whether the driver will avoid the identified risk;
responsive to determining to present an alert about the identified risk, determine an intensity level for the alert based on a level of importance associated with the identified risk; and
cause an alert to be presented to the driver by an output system of the vehicle at the determined intensity level.

11. The system of claim 10, wherein the past driving behavior of the driver includes past driving behavior of the driver at the current location of the vehicle.

12. The system of claim 10, wherein the general driving behavior of one or more other drivers includes driving behavior data of the one or more other drivers at the current location of the vehicle or a location that is similar to the current location of the vehicle.

13. The system of claim 10, wherein the alert is at least one of a visual alert, an audio alert, and a haptic alert.

14. The system of claim 10, wherein determining whether the driver will avoid the identified risk includes predicting whether the driver will avoid the identified risk based on real-time driver data or vehicle data.

15. The system of claim 10, wherein determining an intensity level for the alert includes determining a reduced intensity level when the past driving behavior of the driver and a general driving behavior of one or more other drivers indicates a high success rate of avoiding the identified risk.

16. The system of claim 15, wherein the high success rate includes successful avoidance of the risk for a threshold number of times or a threshold percentage of times.

17. The system of claim 10, determining an intensity level for the alert includes determining an elevated intensity level when the past driving behavior of the driver and a general driving behavior of one or more other drivers indicates a low success rate of avoiding the identified risk.

18. The system of claim 10, wherein the one or more processors are configured to:
identify the driver of the vehicle based on data acquired by the one or more sensors.

19. The system of claim 10, wherein the one or more processors are configured to:
determine a current location of the vehicle; and
identify a risk at the determined current location of the vehicle.

20. A computer program product for behavior-based alerting a driver of a vehicle, the computer program product comprising a non-transitory computer readable storage medium having program code embodied therewith, the program code executable by a processor to perform a method comprising:
determining whether the driver will avoid an identified risk at a current location of the vehicle based on at least:
a past driving behavior of the driver successfully avoiding the identified risk or a similar risk; and
a general driving behavior of one or more other drivers that includes a success rate of avoiding the identified risk or a similar risk;
determining whether to present an alert about the identified risk based on whether the driver will avoid the identified risk;
responsive to determining to present an alert about the identified risk, determining an intensity level for the alert based on a level of importance associated with the identified risk; and
causing an alert to be presented to the driver by an output system of the vehicle at the determined intensity level.

* * * * *